(12) United States Patent
Walton

(10) Patent No.: US 8,143,747 B2
(45) Date of Patent: Mar. 27, 2012

(54) FLUX CONTROL SYSTEM FOR ACTIVE VOLTAGE CONDITIONING

(75) Inventor: Simon James Walton, Taradale (NZ)

(73) Assignee: ABB Limited, Grafton, Auckland (NZ)

( * ) Notice: Subject to any disclaimer, the term of this patent is extended or adjusted under 35 U.S.C. 154(b) by 97 days.

(21) Appl. No.: 12/544,485

(22) Filed: Aug. 20, 2009

(65) Prior Publication Data

US 2010/0026275 A1  Feb. 4, 2010

Related U.S. Application Data

(63) Continuation of application No. PCT/NZ2008/000027, filed on Feb. 14, 2008.

(60) Provisional application No. 60/890,669, filed on Feb. 20, 2007.

(51) Int. Cl.
*H02J 3/00* (2006.01)

(52) U.S. Cl. .................. 307/105; 307/102; 307/103

(58) Field of Classification Search ............ 307/102, 307/103, 105
See application file for complete search history.

(56) References Cited

U.S. PATENT DOCUMENTS

| | | | |
|---|---|---|---|
| 4,017,790 A * | 4/1977 | Friedlander | 307/102 |
| 4,135,101 A * | 1/1979 | Young et al. | 307/39 |
| 4,286,207 A * | 8/1981 | Spreadbury et al. | 323/263 |
| 5,138,247 A | 8/1992 | Tanoue et al. | |
| 5,319,534 A | 6/1994 | Brennen | |
| 5,610,501 A | 3/1997 | Nelson et al. | |
| 5,854,743 A | 12/1998 | Yamamoto | |
| 5,949,221 A * | 9/1999 | Edwards | 323/209 |
| 6,327,162 B1 | 12/2001 | Larsen et al. | |
| 6,750,563 B2 * | 6/2004 | Rostron et al. | 307/103 |
| 7,920,392 B2 * | 4/2011 | Schneider et al. | 307/105 |
| 2005/0071050 A1 | 3/2005 | Chow et al. | |
| 2006/0044847 A1 * | 3/2006 | Baumgart et al. | 363/37 |

FOREIGN PATENT DOCUMENTS

| | | |
|---|---|---|
| EP | 0 476 618 | 3/1992 |
| WO | WO 2006/064742 | 6/2006 |

OTHER PUBLICATIONS

Supplementary European Search Report issued in the corresponding Application No. 08724017.2-2207 dated Mar. 17, 2010.
Cavini et al., "Shunt Active Filters Controller with New Saturation Strategy" The 30th Annual Conference of the IEEE Industrial Electronics Society, Nov. 2-6, 2004, Busan, Korea, vol. 1, pp. 546-551.
Praveen et al., "Review of Dynamic Voltage Restorer for Power Quality" The 30th Annual Conference of the IEEE Industrial Electronics Society, Nov. 2-6, 2004, Busan, Korea, vol. 1, pp. 749-754.

* cited by examiner

*Primary Examiner* — Fritz M Fleming
(74) *Attorney, Agent, or Firm* — Buchanan Ingersoll & Rooney PC

(57) ABSTRACT

A flux control system for a three-phase active voltage conditioner that utilizes an injection transformer to apply calculated compensation voltage to a mains supply. The flux control system is configured to modify the compensation voltage to be applied to at least one primary terminal of the injection transformer so as to avoid magnetic saturation of the injection transformer. The flux control system includes magnetic flux model modules that are configured to calculate a core flux level of the injection transformer, flux offset modules that are configured to apply a first modification to the compensation voltage to gradually reduce any flux offset in the injection transformer, and peak flux modules that are configured to apply a second modification to the compensation voltage to prevent the core flux level from exceeding a preset range.

50 Claims, 4 Drawing Sheets

FLUX CONTROL SYSTEM FOR ACTIVE VOLTAGE CONDITIONING

RELATED APPLICATION

This application is a continuation application under 35 U.S.C. §120 of PCT/NZ2008/000027 filed as an International Application on Feb. 14, 2008 designating the U.S., which claims the benefit under 35 U.S.C. §119 of U.S. Provisional Patent No. 60/890,669 filed on Feb. 20, 2007, the entire contents of which are hereby incorporated by reference in their entireties.

FIELD

The present disclosure relates to active voltage conditioning of a three-phase mains supply.

BACKGROUND INFORMATION

Disturbance in utility and mains supply voltages can be a major problem for industrial and commercial users that depend on electronic equipment for factory and office automation. Voltage sags have been identified as being one of the most commonly occurring disturbances. Mains voltage sags of sufficient magnitude can cause electrical or electronic equipment to malfunction or shut down, which can be very costly, especially in continuous process applications. One known solution to this problem is to install onsite active voltage conditioning units that are arranged to detect voltage disturbances or sags in the supply and inject a corrective voltage into the supply to compensate for the voltage disturbances or sags and ensure reliability.

A known active voltage conditioner configuration is shown in FIG. 1. The active voltage conditioner 1 is connected to the output of a local distribution transformer 3 that distributes a three-phase mains supply 5. The active voltage conditioner 1 comprises a three-phase voltage source inverter 7, a bypass circuit 9, and an injection transformer 8 connected in a series to each other between the incoming main supply from the distribution transformer 3 and a load 4 connected to the active voltage conditioner 1. A control system of the active voltage conditioner 1 monitors the incoming supply voltage and when it deviates from the nominal voltage level, the control system inserts an appropriate compensating voltage using the inverter 7 and series injection transformer 8 to regulate the load voltage 4 to the nominal value, in an attempt to eliminate voltage disturbances from the mains supply affecting the load. Energy (potential) for the compensating voltage is provided from a three-phase rectifier, which is connected to the input supply, directly or via a transformer or autotransformer, and which can supply or remove power from the inverter 7 as required. The rectifier controls power flow in and out of the input supply from the distribution transformer 3 in such a way as to hold the inverter 7 input direct current (DC) bus supply at a constant value. In this way, the control system automatically acts to provide energy balance drawing extra power from the input supply when required or supplying it back to the input supply if the voltage correction results in excess regenerated energy.

The control system typically utilizes a digital signal processor (DSP) microprocessor-based system that is arranged to calculate any vectorial voltage differences from a perfect balanced and regulated three-phase supply, and then use these differences to calculate and create appropriate pulse width modulated (PWM) waveforms to control the inverter 7 to insert an appropriate compensating voltage in both phase and magnitude on individual phases via the series injection transformer 8. For instance, the DSP is arranged to sample the incoming mains supply and calculate the correction or compensation voltage to be applied through the injection transformer 8 to restore the output to a regulated, balanced three phase sinusoidal supply, or as close as possible to this within the correction capabilities of the control system. The three phase voltages of the mains supply are measured in real time and then transformed into the stationary reference frame where they are represented as alpha and beta terms (values). This is an application of standard vector control principles that are known in the art. The DSP then calculates the alpha and beta voltage compensation terms, Va and Vb, necessary to bring the utility supply back to the set nominal level. The DSP then utilizes Va and Vb to generate the PWM waveforms for controlling the inverter 7 to generate and apply the appropriate compensation voltage(s) to the primary terminals of the injection transformer 8.

Various similar active voltage conditioning configurations are proposed and described in U.S. Pat. Nos. 5,319,534, 5,610,501 and 6,327,162, which are incorporated herein by reference. All these configurations also utilize the inverter fed injection transformer topology for regulating the supply voltage to a load.

During operation of such active voltage conditioners, when step or sudden changes are made to the voltage of the primary of the injection transformer, the transformer core flux adjusts in proportion to the applied voltage and there is also normally a flux offset present. Subsequent changes in voltage will add and subtract from this flux offset and this can make the peak core flux levels larger or smaller depending on the phase and magnitude of the voltage changes. Therefore, there is a concern for the occurrence of core magnetic saturation, which results in very high inverter currents and possible loss of system control. This attribute can reduce the reliability and effectiveness of the active voltage conditioner.

In this specification, where reference has been made to external patent specifications, other external documents, or other sources of information, such reference is generally for the purpose of providing a context for discussing various features of the present disclosure. Unless specifically stated otherwise, reference to such external documents is not to be construed as an admission that such documents, or such sources of information, in any jurisdiction, constitute prior art, or form part of the common general knowledge in the art.

Exemplary embodiments of the present disclosure provide a flux control system for reducing the risk of core magnetic saturation in an injection transformer of an active voltage conditioner.

SUMMARY

In a first exemplary aspect, the present disclosure provides a flux control system for a three-phase active voltage conditioner. The flux control system is configured to modify a compensation voltage to be applied to a primary terminal of an injection transformer. The exemplary flux control system comprises a magnetic flux model module configured to calculate a core flux level of an injection transformer based on a compensation voltage to be applied to at least one primary terminal of the injection transformer, and an intrinsic time constant term specific to the injection transformer. In addition, the exemplary flux, control system comprises a flux offset module configured to apply a first modification to the compensation voltage based on the core flux level calculated by the flux model module and an extrinsic time constant term calculated to gradually reduce any flux offset in the injection transformer. The exemplary flux control system also comprises a peak flux module configured to apply a second modification to the compensation voltage to prevent the core flux level calculated by the flux model module from moving outside a preset range.

In accordance with the first exemplary aspect, each magnetic flux model module can comprise an integrator that is configured to integrate the compensation voltage(s) and output core flux level(s), where the core flux level(s) are fed back into the input of the integrator via a negative feedback loop comprising an amplifier that is configured to amplify the core flux level(s) by the intrinsic time constant term.

In accordance with an exemplary embodiment, each flux offset module is configured to feed the calculated core flux level(s) back into the compensation voltage(s) via a negative feedback loop comprising an amplifier that is configured to amplify the core flux level(s) by the extrinsic time constant term.

In accordance with an exemplary embodiment, each peak flux module can comprise: a dead zone modifier that is configured to generate one of (i) a limiter term of substantially zero if the calculated core flux level(s) is/are within a range defined between zero and a preset positive flux threshold, and (ii) a non-zero limiter term whose magnitude is dependent on an amount by which the calculated core flux level(s) is/are outside the range. In addition, each peak flux module can comprise an amplifier that is configured to amplify the limiter term by a preset scalar to calculate and output the amplifier limiter term, and to feed back the core flux level(s) back into the compensation voltage(s) via a negative feedback loop comprising a multiplier that is configured to multiply core flux level(s) by the amplified limiter term.

According to an exemplary embodiment, the three-phase compensation voltages and flux level(s) can be represented collectively in a stationary reference frame. For example, for a three wire three phase system, the compensation voltages and flux level(s) can be represented in the stationary reference frame in Cartesian co-ordinates as alpha and beta terms, or alternatively as polar co-ordinates. Alternatively, the voltage compensation and flux level terms can be described in terms of a rotating reference frame (DQ representation). In another alternative embodiment, the three-phase compensation voltages and flux level(s) can be represented individually in the time domain using phase quantities or other non-orthogonal axes.

In a second exemplary aspect, the present disclosure provides a method of controlling a core flux level of an injection transformer in a three-phase active voltage conditioner. The exemplary method comprises receiving a compensation voltage to be applied to an injection transformer, and calculating a core flux level of the injection transformer based on the received compensation voltage and an intrinsic time constant term specific to the injection transformer. In addition, the exemplary method comprises applying a first modification to the compensation based on the calculated core flux level and an extrinsic time constant term calculated to gradually reduce any flux offset in the injection transformer, and applying a second modification to the compensation voltage to prevent the core flux level from moving outside a preset range.

According to an exemplary embodiment, the step of calculating the injection transformer core flux level(s) can comprise the steps of: integrating the compensation voltage(s) to generate core flux level(s); amplifying the core flux level(s) by the intrinsic time constant term; and feeding back the amplified core flux level(s) into the compensation voltage(s) via a negative feedback loop.

According to an exemplary embodiment, the step of applying a first modification to the compensation voltage(s) comprises the steps of: amplifying the calculated core flux level(s) by the extrinsic time constant term; and feeding back the amplified core flux level(s) into the compensation voltage(s) via a negative feedback loop.

According to an exemplary embodiment, the step of applying a second modification to the compensation voltage(s) comprises the steps of: generating one of (i) a limiter term of substantially zero if the calculated core flux level(s) is/are within a range defined between zero and a preset positive flux threshold, and (ii) a non-zero limiter term whose magnitude is dependent on an amount by which the calculated core flux level(s) exceed the range; amplifying the generated limiter term by a preset scalar; multiplying the calculated core flux level(s) by the amplified limiter term; and feeding back the multiplied core flux level(s) into the compensation voltage(s) via a negative feedback loop.

According to an exemplary embodiment, the three-phase compensation voltages and flux level(s) can be represented collectively in a stationary reference frame. For example, for a three wire three phase system, the compensation voltages and flux level(s) can be represented in the stationary reference frame in Cartesian co-ordinates as alpha and beta terms, or alternatively as polar co-ordinates. Alternatively, the voltage compensation and flux level terms can be described in terms of a rotating reference frame (DQ representation). In another alternative embodiment, the three-phase compensation voltages and flux level(s) can be represented individually in the time domain using phase quantities or other non-orthogonal axes.

In a third exemplary aspect, the present disclosure provides a flux control system for a three-phase active voltage conditioner. The flux control system is configured to modify alpha and beta voltage compensation terms of a compensation voltage to be applied to an injection transformer. The exemplary flux control system comprises alpha and beta flux control subsystems configured to receive the alpha and beta voltage compensation terms, respectively, and output modified compensation terms. Each of the alpha and beta flux control subsystems comprises a flux model module configured to respectively generate an alpha or beta flux term based on the alpha or beta voltage compensation term and an intrinsic time constant term specific to an injection transformer to which the compensation voltage is to be applied. In addition, each of the alpha and beta flux control subsystems comprises a flux offset module configured to respectively apply a first modification to the alpha or beta voltage compensation term based on the alpha or beta flux term generated by the flux model module and an extrinsic time constant term calculated to gradually reduce any flux offset in the injection transformer. The exemplary flux control system also comprises a peak flux limiter configured to calculate a peak flux level representation for the injection transformer based on the alpha and beta flux terms respectively generated by the alpha and beta flux control subsystems, and generate a limiter term based on a comparison of the calculated peak flux level representation to a preset positive flux threshold. Each of the alpha and beta flux control subsystems furthers comprises a peak flux module configured to apply a second modification to the alpha or beta voltage compensation term based on the alpha or beta flux term generated by the flux model module, respectively, and the limiter term generated by the peak flux limiter to prevent the peak flux level representation in the injection transformer from exceeding the positive flux threshold.

According to an exemplary embodiment, each flux model module can comprise an integrator that is configured to integrate the alpha or beta voltage compensation term and output an alpha or beta flux term, respectively, and feed back the alpha or beta flux term into the input of the integrator via a negative feedback loop comprising an amplifier that is configured to amplify the alpha or beta flux term by the intrinsic time constant term, respectively.

According to an exemplary embodiment, each flux offset module can be arranged to feed the alpha or beta flux term back into the alpha or beta voltage compensation term via a negative feedback loop comprising an amplifier that is configured to amplify the alpha or beta flux term by the extrinsic time constant term.

According to an exemplary embodiment, the peak flux limiter can comprise: a peak flux level module that is arranged to calculate a peak flux level representation for the injection transformer based on the alpha and beta flux terms from the alpha and beta flux control subsystems, respectively; a dead zone modifier that receives the calculated peak flux level representation and that is configured to generate one of (i) a limiter term of substantially zero if the peak flux level representation lies within a range between zero and the preset positive flux threshold, and (ii) a non-zero limiter term whose magnitude is dependent on an amount by which the calculated peak flux level representation exceeds the positive flux threshold; and an amplifier that is configured to amplify the limiter term by a preset scalar and output the amplifier limiter term.

According to an exemplary embodiment, each peak flux module can be arranged to feed the alpha or beta flux term back into the alpha or beta voltage compensation term via a negative feedback loop comprising a multiplier that is configured to multiply the alpha or beta flux term by the amplified limiter term from the peak flux limiter, respectively.

In a fourth exemplary aspect, the present disclosure provides a method of controlling a core flux of an injection transformer in a three-phase active voltage conditioner. The exemplary method comprises receiving alpha and beta voltage compensation terms calculated in a stationary reference frame for application to an injection transformer. In addition, the exemplary method comprises modeling flux of the injection transformer and generating alpha and beta flux terms based on the alpha and beta voltage compensation terms, respectively, and an intrinsic time constant term specific to the injection transformer. The exemplary method also comprises applying a first modification to the alpha and beta voltage compensation terms based on the generated alpha and beta flux terms, respectively, and an extrinsic time constant term calculated to gradually reduce any flux offset in the injection transformer. Furthermore, the exemplary method comprises calculating a peak flux level representation for the injection transformer based on the generated alpha and beta flux terms, respectively, and generating a limiter term based on a comparison of the calculated peak flux level representation to a preset positive flux threshold. The exemplary method also comprises applying a second modification to the alpha and beta voltage compensation terms based on the generated alpha and beta flux terms, respectively, and the generated limiter term to prevent the peak flux level representation in the injection transformer from exceeding the positive flux threshold.

According to an exemplary embodiment, the step of modeling the injection transformer flux and generating the alpha and beta flux terms comprises the steps of: integrating the alpha and beta voltage compensation terms to generate respective alpha and beta flux terms; amplifying the alpha and beta flux terms by the intrinsic time constant term; and feeding back the amplified alpha and beta flux terms into their respective alpha and beta voltage compensation terms via a negative feedback loop.

According to an exemplary embodiment, the step of applying a first modification to the alpha and beta voltage compensation terms comprises the steps of: amplifying the alpha and beta flux terms by the extrinsic time constant term; and feeding back the amplified alpha and beta flux terms into their respective alpha and beta voltage compensation terms via a negative feedback loop.

According to an exemplary embodiment, the step of generating a limiter term based on a comparison of the calculated peak flux level representation to the preset positive flux threshold comprises the steps of: generating one of (i) a limiter term of substantially zero if the calculated peak flux level representation is within a range between zero and the preset positive flux threshold, and (ii) a non-zero limiter term whose magnitude is dependent on an amount by which the calculated peak flux level representation exceeds the positive flux threshold; and amplifying the generated limiter term by a preset scalar.

According to an exemplary embodiment, the step of applying a second modification to the alpha and beta voltage compensation terms comprises the steps of: multiplying the alpha and beta flux terms by the amplified limiter term; and feeding back the multiplied alpha and beta flux terms into their respective alpha and beta voltage compensation terms via a negative feedback loop.

In a fifth exemplary aspect, the present disclosure broadly provides a computer program or computer software that is recorded on a computer-readable recording medium (e.g., nonvolatile memory) and that comprises instructions for carrying out the system or method steps described with respect of any one of the exemplary first to fourth aspects of the present disclosure.

Various features as described hereinafter may apply to any one or more of the first to-fifth exemplary aspects of the present disclosure as described above.

By way of example, the active voltage conditioner can be configured to condition a three-phase mains supply, although the present disclosure is not limited to this arrangement. According to an exemplary embodiment, the primary terminals of the injection transformer can be connected, directly or indirectly, to the output of a three-phase inverter. According to an exemplary embodiment, the calculated compensation voltage(s) or the alpha and beta voltage compensation terms calculated in the stationary reference frame can be utilized to generate corresponding pulse width modulated (PWM) signals for driving the inverter to generate the appropriate compensating voltages for application to the primary terminals of the injection transformer.

According to an exemplary embodiment, the active voltage conditioner is online in that it is configured to continuously monitor the mains supply voltage and continuously apply a compensating voltage via the injection transformer to regulate the voltage supply.

By way of the example, the flux control system can be a subsystem of the overall control system of the active voltage conditioner. Alternatively, the flux control system can be a separate control module. It will be appreciated that the flux control system and associated method may be implemented in hardware, software or a combination thereof. For instance, an exemplary embodiment of the present disclosure provides a computer-readable recording medium (e.g., non-volatile memory) having recorded (encoded) thereon a computer-readable program that causes a computer communicatively connected to the computer-readable recording medium to carry out functional operations of the flux control system. For example, the flux control system and associated method may be implemented by a microprocessor, microcontroller, or any other programmable device executing computer-readable software recorded on a computer-readable recording medium (e.g., ROM, hard drive, flash memory, etc.).

The terms "alpha" and "beta" are intended to represent Cartesian co-ordinates of three-phase characteristics, such as voltage and flux levels, in the stationary reference frame.

The term "comprising" as used in this specification and claims means "consisting at least in part of". When interpreting each statement in this specification and claims that includes the term "comprising", features other than those prefaced by the term may also be present. Related terms such as "comprise" and "comprises" are to be interpreted in the same manner.

Having described exemplary features of the present disclosure, the following description illustrates exemplary configurations in which various features of the present disclosure can be implemented. It is to be understood that the exemplary configurations as described heretofore and hereinafter are intended to examples to which the present disclosure is not to be limited.

BRIEF DESCRIPTION OF THE DRAWINGS

Additional features, advantages and refinements of the present disclosure are described in more detail below with reference to exemplary embodiments illustrated the drawings, in which.

DETAILED DESCRIPTION

Figure 1:
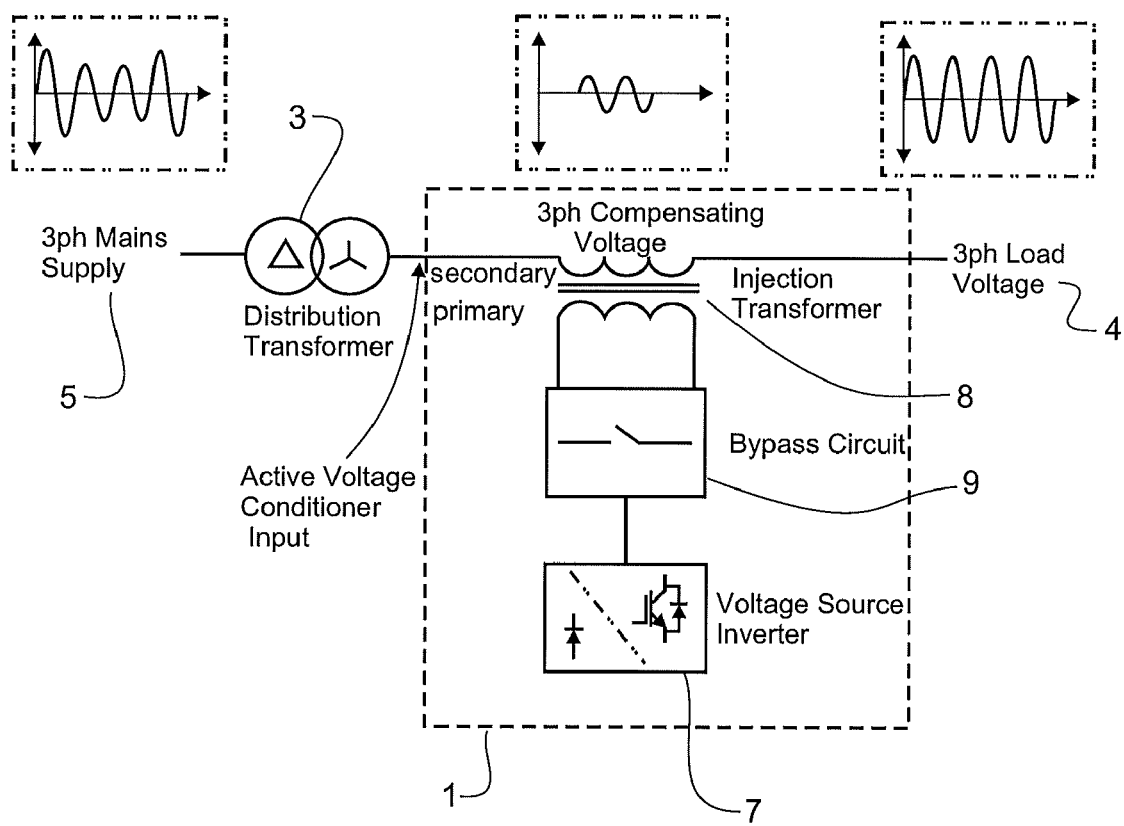
FIG. 1 is a schematic diagram of a known active voltage conditioner configuration for regulating a three-phase mains supply.

An exemplary embodiment of the present disclosure provides a form flux control system and associated method for online three-phase active voltage conditioners that utilise an injection transformer to apply a compensation voltage to a mains supply, such as in a manner previously described, for example. For example, the flux control system can be employed to modify the calculated correction or compensation voltages to be applied to the primary (input) terminals of the injection transformer so as to achieve optimal performance in regulating the mains supply, while also ensuring that the core flux of the injection transformer is controlled and limited so as to avoid magnetic saturation that may lead to loss of system control and unreliable voltage conditioning during operation.

According to an exemplary embodiment, the flux control system can be configured to continuously predict or estimate the magnitude and angular position of the magnetic flux of the core of the injection transformer based on the calculated compensation voltage to be applied to the primary terminals of the transformer. The flux control system can then modify the magnitude and phase of the calculated compensation voltage, based on the predicted magnitude and angular position of the flux, so as to maximize the application of an applied voltage without exceeding a maximum preset flux level or magnitude that will cause magnetic saturation of the transformer of the core.

The control system of the active voltage conditioner typically can be configured to calculate, in the stationary reference frame, alpha and beta voltage compensation terms, Va and Vb, which are necessary to bring the three-phase mains supply back to a predetermined nominal level. The control system then utilizes Va and Vb to generate PWM waveforms for controlling a three-phase inverter to generate and apply appropriate compensation voltage(s) to the primary terminals of the injection transformer, to thereby correct or regulate each of the individual phases of the incoming supply voltage.

According to an exemplary embodiment, the flux control system can be configured to operate as a subsystem of the control system of the active voltage conditioner. In addition, the flux control system can be configured to model, predict or calculate the core flux levels of the injection transformer based on Va and Vb, and an intrinsic characteristic(s) specific to the injection transformer. For example, the intrinsic characteristic can be an intrinsic time constant term that is specific to the injection transformer. The flux control system can then apply a first modification to Va and Vb to gradually reduce any flux offset in the core of the injection transformer and, if necessary, a second modification to Va and Vb to ensure the peak core flux level remains below a predetermined positive threshold. The modified alpha and beta voltage compensation terms, Voa and Vob, are then utilised by the remainder of the control system to generate the PWM signals or waveforms for controlling the inverter to apply the appropriate compensation voltages to the primary terminals of the injection transformer for conditioning and regulating the mains supply without driving the injection transformer into magnetic saturation.

Figure 2:
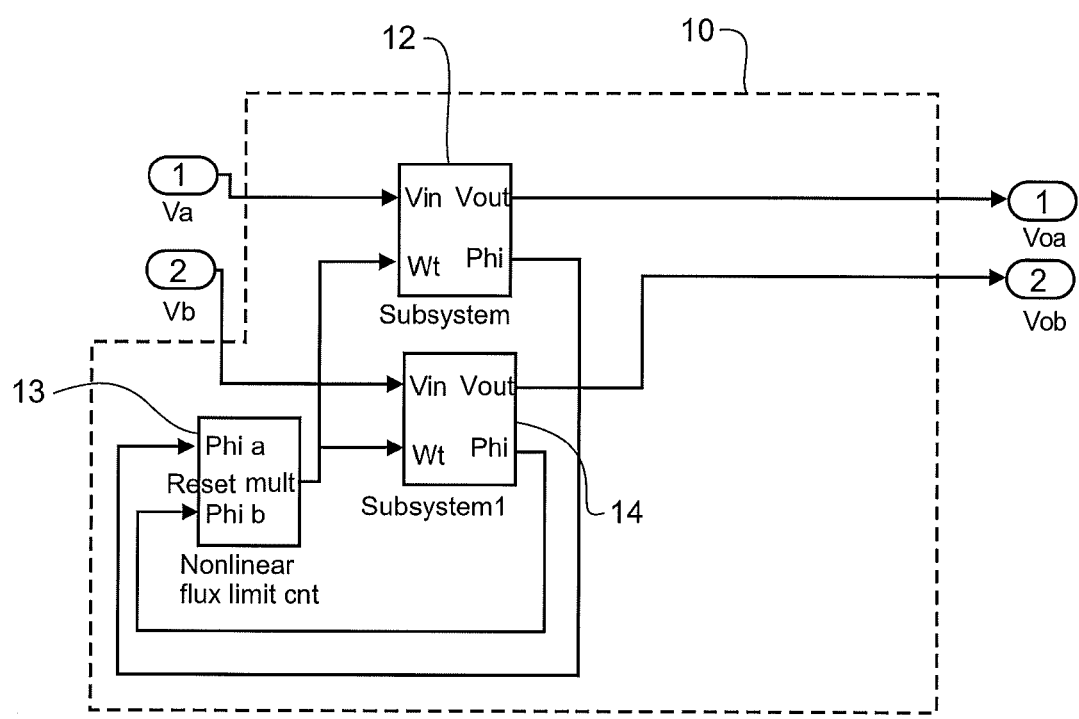
FIG. 2 is a schematic diagram of an exemplary flux control system according to at least one embodiment of the disclosure, in which examples of alpha and beta flux control subsystems and a peak flux limiter are shown.
Figure 3:
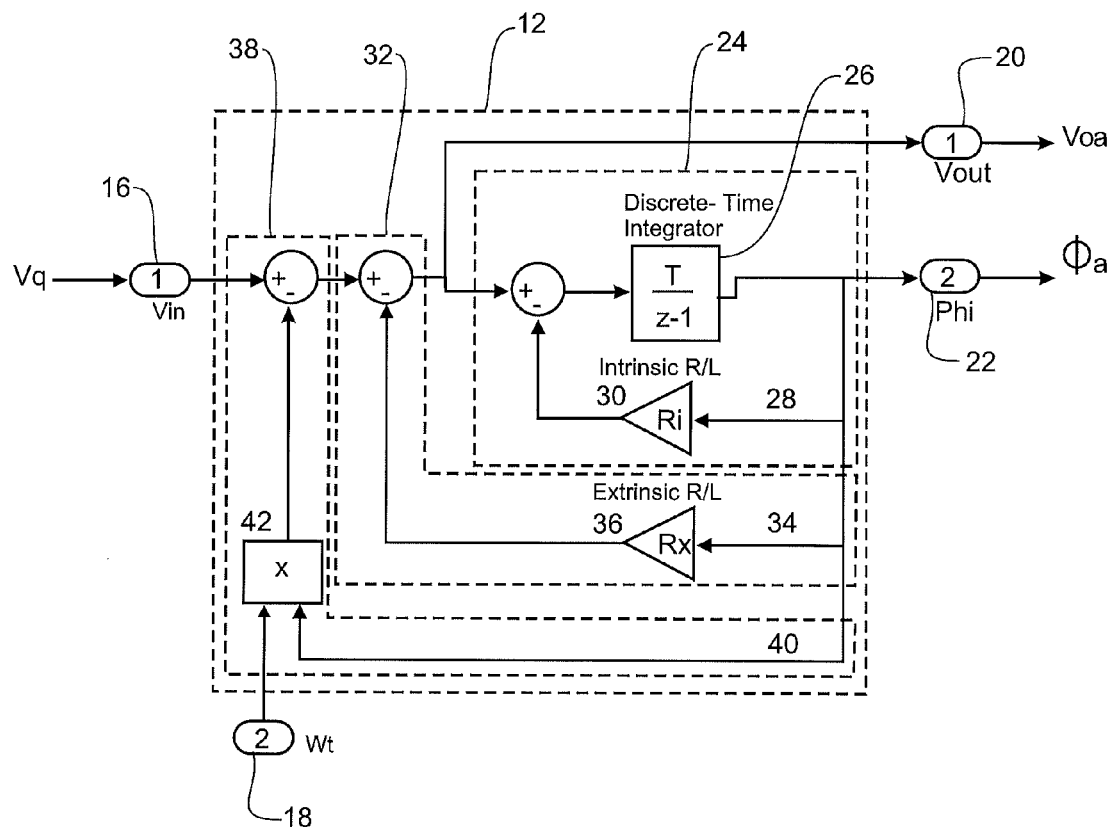
FIG. 3 shows a schematic diagram of an exemplary configuration of the alpha flux control subsystem of the flux control system.

FIG. 2 is a schematic diagram of an exemplary flux control system according to at least one embodiment of the present disclosure. As illustrated in FIG. 2, a flux control system 10 receives, as inputs, the alpha and beta voltage compensation terms, Va and Vb, and outputs the modified alpha and beta voltage compensation terms, Voa and Vob. Va and Vb are independently modified by separate alpha 12 and beta 14 flux control subsystems of the flux control system 10, respectively. The alpha 12 and beta 14 flux control subsystems are identical in structural configuration. By way of example, FIG. 3 shows an exemplary configuration of the alpha flux control subsystem 12 that will be described in more detail below. Accordingly, it is to be understood that the beta flux control subsystem 13 is configured identically to the alpha flux control subsystem 12, except that the beta flux control subsystem 13 is configured to operate in accordance with receiving beta voltage compensation term Vb and a limiter term Wt at an input thereof. Therefore, the beta flux control subsystem 13 is configured to perform operative functions similar to those as described hereinafter with respect to the alpha flux control subsystem 12.

The alpha flux control subsystem 12 receives Va and a limiter term Wt from a peak flux limiter 13 of the flux control system (see FIG. 2) at input ports 16 and 18 of the alpha flux control subsystem 12, respectively, and outputs Voa and an alpha flux term φa at its output ports 20 and 22, respectively. According to an exemplary embodiment, the alpha flux control subsystem 12 can comprise a flux model module 24 that is configured to generate the alpha flux term φa based on the alpha voltage compensation term Va and an intrinsic time constant term specific to characteristics of the injection transformer. According to an exemplary embodiment, the flux model module 24 calculates the alpha flux term $\phi a$ as at least one core flux level of the injection transformer based on compensation term Va and the intrinsic time constant term specific to characteristics of the injection transformer. As illustrated in the example of FIG. 3, the flux model module 24 can comprise an integrator 26 that is configured to integrate Va and output alpha flux term $\phi a$. Further, the flux model module 24 can be configured to feed $\phi a$ back into the input of the integrator 26 via a negative feedback loop 28 that comprises an amplifier 30 which is configured to amplify $\phi a$ by an intrinsic time constant term Ri. According to an exemplary embodiment, the intrinsic time constant term Ri can be selected based on the characteristics of the injection transformer and represent the actual transformer resistance R over a magnetizing inductance L, for example. The integrator 26 may, for example, be a discrete-time integrator modelled in the Z domain, or any other integration module could alternatively be utilized if appropriate.

According to an exemplary embodiment, the alpha flux control subsystem 12 can also comprise a flux offset module 32 that is configured to apply a first modification to Va based on alpha flux term $\phi a$ generated by the flux model module 24 and at least one extrinsic characteristic, such as, for example, an extrinsic time constant term Rx which is calculated to gradually reduce any flux offset in the injection transformer. For example, the flux offset module 32 can be configured to feed the calculated alpha flux term $\phi a$ back into Va via a negative feedback loop 34 that comprises an amplifier 36 which is configured to amplify $\phi a$ via the extrinsic time constant term Rx. According to an exemplary embodiment, the extrinsic time constant term Rx does not model the actual injection transformer but instead produces a small voltage across the primary of the injection transformer of the correct phase and magnitude to reset any flux offset to substantially zero gradually over time. The intrinsic time constant term Ri of the flux model module 24 can adjusted to match actual characteristics of the injection transformer, whereas the extrinsic time constant term Rx utilized by the flux offset module 32 is adjusted to reset any flux offset in a reasonable time without creating significant distortion in the compensating voltage output by the active voltage conditioner.

According to an exemplary embodiment, the alpha flux control system 12 can also comprise a peak flux module 38 that is configuration to apply a second modification to Va based on alpha flux term $\phi a$ generated by the flux model module 24 and a limiter term Wt which is generated by peak flux limiter 13 (see FIG. 2) to prevent the peak flux level in the core of the injection transformer from exceeding a preset positive flux threshold. In particular, the peak flux module 38 is arranged to feed alpha flux term $\phi a$ back into Va via a negative feedback loop 40 that comprises a multiplier 42 which is arranged to multiply $\phi a$ by Wt outputted from the peak flux limiter 13.

Figure 4:
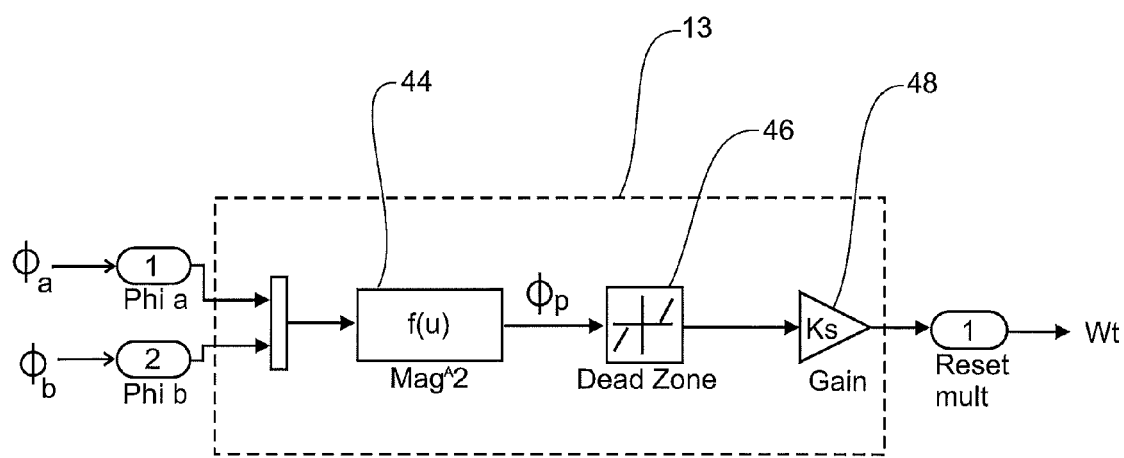
FIG. 4 shows a schematic diagram of an exemplary configuration of the peak flux limiter of the flux control system.

Referring to FIG. 4, an exemplary configuration of the peak flux limiter 13 of the flux control system is described in more detail. The peak flux limiter 13 is configured to receive $\phi a$ and $\phi b$ from the alpha 12 and beta 14 flux control subsystems as inputs thereto. According to an exemplary embodiment, $\phi a$ and $\phi b$ can represent the core flux levels of the injection transformer in the stationary reference frame. $\phi a$ and $\phi b$ are passed through a peak flux level module 44 that is configured to calculate a value $\phi p$ that represents or is a function of the peak flux level of the core of the injection transformer. According to an exemplary embodiment, the value $\phi p$ calculated by the module 44 can be the square of the peak flux level of the core of the injection transformer. For example, the module 44 can be configured to calculate the square of the magnitude or norm of the vector resulting from the $\phi a$ and $\phi b$ terms through vectorial calculation. It will be appreciated that the vector magnitude or norm involves taking the square root of the sum of the squares of the orthogonal vector $\phi a$ and $\phi b$ terms. According to an alternative exemplary embodiment, the peak flux level module 44 can be configured to calculate and output a value $\phi p$ that represents the vector norm or magnitude of the peak flux level itself. According to an exemplary embodiment, it is less computationally intensive to use the square of the vector norm or magnitude of the peak flux level for $\phi p$ as shown in FIG. 4. This also has the benefit of emphasizing large excursions in flux magnitude. It will also be appreciated that any other non-negative, non-linear function of the vector norm or magnitude could be calculated and output as the value $\phi p$ if desired.

According to the exemplary embodiment illustrated in FIG. 4, the output $\phi p$ of the peak flux level module 44 is applied to a dead zone modifier 46 which is configured to generate a limiter term of substantially zero if $\phi p$ lies within a range defined between 0 and a preset positive flux threshold or alternatively a non-zero limiter term, the magnitude of which is dependent on the amount by which the $\phi p$ lies outside the range, i.e. the amount by which it exceeds the positive flux threshold. According to an exemplary embodiment, the limiter term can increase linearly in accordance with the amount by which $\phi p$ lies outside the range. The positive threshold can be determined by the characteristics of the injection transformer and the peak flux levels beyond which magnetic saturation will occur. The limiter term can then be amplified by a scaler Ks at an amplifier 48 to generate the limiter term output Wt.

In summary, the flux control system according to an exemplary embodiment of the present disclosure is configured to operate in such a way that, under normal steady-state operating conditions, the flux of the injection transformer is modelled in real time and any flux offset is gradually reset to zero or close to zero by applying suitable scaled and aligned voltage offsets (the first modification). Further, should a voltage compensation change be appropriate that will cause the peak transformer flux to go above a level defined in the dead zone limit, offset voltages will be produced which limit the actual voltages generated by the inverter to prevent significant flux excursions (the second modification). In this way, the online active voltage conditioner will operate to produce the fastest voltage adjustments allowable without resultant problematic injection transformer magnetic saturation.

It will be appreciated that the flux control system may be implemented as a subsystem within the control system of an active voltage conditioner. For example, the flux control system or algorithm(s) may be implemented as computer software or a computer program that is recorded on a computer-readable recording medium and executed by a microprocessor, microcontroller or other programmable device that is part of the control system. Alternatively, the flux control system may be in the form of an independent module embedded in hardware or the like and which co-operates with the control system. It will be appreciated that the term "module" in view of the present disclosure can constitute one or more circuitry elements, and/or a microprocessor, microcontroller or other programmable device that is part of the control system and configured to execute computer software or a computer program recorded on a computer-readable recording medium.

According to an exemplary embodiment, the control system can be performed in the stationary reference frame, using alpha and beta terms. Transformation between three-phase representation in the time domain and representation in the stationary reference frame as alpha and beta terms is known in the art. The alpha and beta terms are Cartesian co-ordinates in the stationary reference frame and it will be appreciated that the flux control system could alternatively be modified to operate in polar co-ordinates or in any other suitable format. Further, it will be appreciated that the flux control system may be implemented or performed in other domains. For example, it will be appreciated that the flux control system need not necessarily be implemented in the stationary reference frame and that the flux control system could be modified to operate in a rotating reference frame using phase quantities or other non-orthogonal axes. For instance, it will be appreciated that for each individual phase, the flux control system may be arranged to: estimate the core flux level in the injection transformer based on the voltage to be applied to the primary terminals for that phase and an intrinsic time constant term specific to the transformer; modify the voltage to be applied based on the estimated flux level and an extrinsic time constant term to gradually reduce any flux offset to substantially zero; and modify the voltage to be applied to prevent peak flux levels from moving outside a preset range. In essence, the modelling of the flux levels in the core of the injection transformer and the modifications (flux offset modification and peak flux modification) to the voltages to be applied to the injection transformer for the three phases may be performed in any suitable domain and format, such as on a collective basis (stationary reference frame) or individually phase by phase, for example.

The foregoing description of the disclosure includes exemplary configurations forms thereof. Modifications may be made thereto without departing from the scope of the disclosure as defined by the accompanying claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A flux control system for a three-phase active voltage conditioner, the flux control system being configured to modify a compensation voltage to be applied to a primary terminal of an injection transformer, the flux control system comprising:
    a magnetic flux model module, of a programmable device, configured to calculate a core flux level of an injection transformer based on a compensation voltage to be applied to at least one primary terminal of the injection transformer, and an intrinsic time constant term specific to the injection transformer;
    a flux offset module configured to apply a first modification to the compensation voltage based on the core flux level calculated by the flux model module and an extrinsic time constant term calculated to gradually reduce any flux offset in the injection transformer; and
    a peak flux module configured to apply a second modification to the compensation voltage to prevent the core flux level calculated by the flux model module from moving outside a preset range.

2. A flux control system according to claim 1, wherein the magnetic flux model module comprises an integrator configured to integrate the compensation voltage to calculate and output the core flux level, and to feed the outputted core flux level fed back into an input of the integrator via a negative feedback loop comprising an amplifier that is configured to amplify the core flux level by the intrinsic time constant term.

3. A flux control system according to claim 2, wherein the integrator is a discreet-time integrator modeled in the Z domain.

4. A flux control system according to claim 1, wherein the intrinsic time constant term represents an actual injection transformer resistance divided by a magnetizing inductance of the injection transformer.

5. A flux control system according to claim 1, wherein the flux offset module is configured to fed the calculated core flux level back into the compensation voltage via a negative feedback loop comprising an amplifier that is configured to amplify the core flux level by the extrinsic time constant term.

6. A flux control system according to claim 5, wherein the extrinsic time constant term is calculated to produce a small voltage across the at least one primary terminal of the injection transformer of a correct phase and magnitude to gradually reset any flux offset in the injection transformer to substantially zero over a predetermined period of time.

7. A flux control system according to claim 1, wherein the peak flux module comprises:
    a dead zone modifier configured to generate one of (i) a limiter term of substantially zero if the calculated core flux level is within a range defined between zero and a preset positive flux threshold, and (ii) a non-zero limiter term whose magnitude is dependent on an amount by which the calculated core flux level is outside the range; and
    an amplifier configured to amplify the generated limiter term by a preset scalar and output the amplifier limiter term,
    wherein the peak flux module is configured to feed the core flux level back into the compensation voltage via a negative feedback loop comprising a multiplier which is configured to multiply the core flux level by the amplified limiter term.

8. A flux control system according to claim 7, wherein the magnitude of the non-zero limiter term increases linearly in accordance with the amount by which the calculated core flux level is outside the range.

9. A flux control system according to claim 1, wherein the compensation voltage includes at least one compensation voltage for each phase of a three-phase input voltage, respectively, such that the compensation voltages are three-phase compensation voltages and the magnetic flux module calculates a core flux level for each compensation voltage, respectively, and
    wherein the three-phase compensation voltage and flux levels are represented collectively in a stationary reference frame.

10. A flux control system according to claim 9 wherein the three-phase compensation voltages and flux level are represented in the stationary reference frame in Cartesian co-ordinates as alpha and beta terms.

11. A flux control system according to claim 1, wherein the compensation voltage includes at least one compensation voltage for each phase of a three-phase input voltage, respectively, such that the compensation voltages are three-phase compensation voltages and the magnetic flux module calculates a core flux level for each compensation voltage, respectively, and
    wherein the three-phase compensation voltages and flux levels are represented in terms of a rotating reference frame.

12. A flux control system according to claim 1, wherein the compensation voltage includes at least one compensation voltage for each phase of a three-phase input voltage, respectively, such that the compensation voltages are three-phase compensation voltages and the magnetic flux module calculates a core flux level for each compensation voltage, respectively, and wherein the three-phase compensation voltage(s) and flux level(s) are represented individually in the time domain.

13. A flux control system according to claim 1, wherein the active voltage conditioner is configured to condition a three-phase mains supply.

14. A flux control system according to claim 1 in combination with the injection transformer, wherein the at least one primary terminal of the injection transformer is connected to an output of a three-phase inverter, such that the injection transformer utilizes the calculated compensation voltage to generate corresponding Pulse Width Modulated (PWM) signals for driving the inverter to generate the appropriate compensating voltages for application to the at least one primary terminal of the injection transformer.

15. A flux control system according to claim 1, wherein the active voltage conditioner is online so as to be configured to continuously monitor a mains supply voltage and continuously apply a compensating voltage via the injection transformer to regulate the voltage supply supplied by the mains supply voltage.

16. A flux control system according to claim 1, wherein the flux control system is configured to modify the compensation voltage to avoid magnetic saturation of the injection transformer.

17. A method of controlling a core flux level of an injection transformer in a three-phase active voltage conditioner, the method comprising the steps of:

receiving a compensation voltage to be applied to an injection transformer;

calculating, with a programmable device, a core flux level of the injection transformer based on the received compensation voltage and an intrinsic time constant term specific to the injection transformer;

applying a first modification to the compensation voltage based on the calculated core flux level and an extrinsic time constant term calculated to gradually reduce any flux offset in the injection transformer; and applying a second modification to the compensation voltage to prevent the core flux level from moving outside a preset range.

18. A method according to claim 17, wherein the step of calculating the core flux level of the injection transformer comprises the steps of:

integrating the compensation to generate the core flux level;

amplifying the core flux level by the intrinsic time constant term; and feeding back the amplified core flux into the compensation via a negative feedback loop.

19. A method according to claim 18, wherein the step of integrating the compensation voltage to generate the core flux level comprises the step of operating a discrete-time integrator modeled in the Z domain.

20. A method according to claim 17, wherein the intrinsic time constant term represents an actual injection transformer resistance divided by a magnetizing inductance of the injection transformer.

21. A method according to claim 17, wherein the step of applying the first modification to the compensation voltage comprises the steps of:

amplifying the calculated core flux level by the extrinsic time constant term; and feeding back the amplified core flux level into the compensation voltage via a negative feedback loop.

22. A method according to claim 21, comprising calculating the extrinsic time constant term to produce a small voltage across at least one primary terminal of the injection transformer of a correct phase and magnitude to gradually reset any flux offset in the injection transformer to substantially zero over a predetermined period of time.

23. A method according to claim 17, wherein the step of applying a second modification to the compensation voltage comprises the steps of:

generating one of (i) a limiter term of substantially zero if the calculated core flux level is within a range defined between zero and a preset positive flux threshold, and (ii) a non-zero limiter term whose magnitude is dependent on an amount by which the calculated core flux level is outside the range;

amplifying the generated limiter term by a preset scalar;

multiplying the calculated core flux level by the amplified limiter term; and feeding back the multiplied core flux level into the compensation voltage via a negative feedback loop.

24. A method according to claim 23, wherein the step of generating a non-zero limiter term whose magnitude is dependent on the amount by which the calculated core flux level is outside the range comprises the step of increasing the limiter term linearly in accordance with the amount by which the calculated core flux level is outside the range.

25. A method according to claim 17, wherein the compensation voltage includes at least one compensation voltage for each phase of a three phase-input voltage, respectively, such that the compensation voltages are three-phase compensation voltages, and the step of calculating the core flux level comprises calculating a core flux level for each compensation voltage, respectively, and wherein the three-phase compensation voltages and flux levels are represented collectively in a stationary reference frame.

26. A method according to claim 25, wherein the compensation voltages and flux levels are represented in the stationary reference frame in Cartesian co-ordinates as alpha and beta terms.

27. A method according to claim 17, wherein the compensation voltage includes at least one compensation voltage for each phase of a three phase-input voltage, respectively, such that the compensation voltages are three-phase compensation voltages, and the step of calculating the core flux level comprises calculating a core flux level for each compensation voltage, respectively, and wherein the three-phase compensation voltage and flux levels are represented in terms of a rotating reference frame.

28. A method according to claim 17, wherein the compensation voltage includes at least one compensation voltage for each phase of a three phase-input voltage, respectively, such that the compensation voltages are three-phase compensation voltages, and the step of calculating the core flux level comprises calculating a core flux level for each compensation voltage, respectively, and wherein the three-phase compensation voltages and flux levels are represented individually in the time domain.

29. A method according to claim 17, wherein the active voltage conditioner is configured to condition a three-phase mains supply.

30. A method according to claim 17, wherein primary terminals of the injection transformer are connected to an output of a three-phase inverter of the active voltage conditioner, such that the injection transformer utilizes the calculated compensation voltage to generate corresponding Pulse Width Modulated (PWM) signals for driving the inverter to generate the appropriate compensating voltages for application to the primary terminals of the injection transformer.

31. A method according to claim 17, wherein the active voltage conditioner is online so as to continuously monitor a mains supply voltage and continuously apply the compensating voltage via the injection transformer to regulate the voltage supply supplied by the mains supply voltage.

32. A method according to claim 17, wherein the controlling of the core flux level avoids magnetic saturation of the injection transformer.

33. A flux control system for a three-phase active voltage conditioner, the flux control system being configured to modify alpha and beta voltage compensation terms of a compensation voltage to be applied to an injection transformer, the flux control system comprising:
  alpha and beta flux control subsystems configured of a programmable device to receive the alpha and beta voltage compensation terms, respectively, and to output modified compensation terms, wherein each of the alpha and beta flux control subsystems comprises
    a flux model module configured to respectively generate an alpha or beta flux term based on the alpha or beta voltage compensation term and an intrinsic time constant term specific to an injection transformer to which the compensation voltage is to be applied, and
    a flux offset module configured to respectively apply a first modification to the alpha or beta voltage compensation term based on the alpha or beta flux term generated by the flux model module and an extrinsic time constant term calculated to gradually reduce any flux offset in the injection transformer; and
  a peak flux limiter configured to calculate a peak flux level representation for the injection transformer based on the alpha and beta flux terms respectively generated by the alpha and beta flux control subsystems, and generate a limiter term based on a comparison of the calculated peak flux level representation to a preset positive flux threshold, wherein the alpha and beta flux control subsystems each further comprise
    a peak flux module configured to apply a second modification to the alpha or beta voltage compensation term based on the alpha or beta flux term generated by the flux model module, respectively, and the limiter term generated by the peak flux limiter to prevent the peak flux level representation in the injection transformer from exceeding the positive flux threshold.

34. A flux control system according to claim 33, wherein the flux model module comprises an integrator configured to integrate the alpha or beta voltage compensation term to calculate and output an alpha or beta flux term, respectively, and to feed the alpha or beta flux term back into the input of the integrator via a negative feedback loop comprising an amplifier that is configured to amplify the alpha or beta flux term by the intrinsic time constant term, respectively.

35. A flux control system according to claim 33, wherein the flux offset module is configured to feed the alpha or beta flux term back into the alpha or beta voltage compensation term via a negative feedback loop comprising an amplifier that is configured to amplify the alpha or beta flux term by the extrinsic time constant term, respectively.

36. A flux control system according to claim 33, wherein the peak flux limiter comprises:
  a peak flux level module, of a programmable device, configured to calculate the peak flux level representation for the injection transformer based on the alpha and beta flux terms from the alpha and beta flux control subsystems, respectively;
  a dead zone modifier configured to receive the calculated peak flux level representation and generate one of (i) a limiter term of substantially zero if the peak flux level representation is within a range between zero and the preset positive flux threshold, and (ii) a non-zero limiter term whose magnitude is dependent on an amount by which the calculated peak flux level representation exceeds the positive flux threshold; and
  an amplifier configured to amplify the generated limiter term by a preset scalar and output the amplified limiter term.

37. A flux control system according to claim 36, wherein the peak flux module is arranged to feed the alpha or beta flux term back into the alpha or beta voltage compensation term via a negative feedback loop comprising a multiplier that is configured to multiply the alpha or beta flux term by the amplified limiter term from the peak flux limiter, respectively.

38. A flux control system according to claim 33, wherein the active voltage conditioner is configured to condition a three-phase mains supply.

39. A flux control system according to claim 33 in combination with the injection transformer, wherein primary terminals of the injection transformer are connected to an output of a three-phase inverter, such that the injection transformer is configured to utilize the alpha and beta voltage compensation terms calculated in a stationary reference frame to generate corresponding Pulse Width Modulated (PWM) signals for driving the inverter to generate the appropriate compensating voltages for application to the primary terminals of the injection transformer.

40. A flux control system according to claim 33, wherein the active voltage conditioner is online so as to continuously monitor the mains supply voltage and continuously apply a compensating voltage via the injection transformer to regulate the voltage supply supplied by the mains supply voltage.

41. A flux control system according to claim 33, wherein the flux control system is configured to modify the compensation voltage terms to avoid magnetic saturation of the injection transformer.

42. A method of controlling a core flux of an injection transformer in a three-phase active voltage conditioner, the method comprising the steps of:
  receiving alpha and beta voltage compensation terms calculated in a stationary reference frame for application to an injection transformer;
  modeling flux of the injection transformer, with a programmable device, and generating alpha and beta flux terms based on the alpha and beta voltage compensation terms, respectively, and an intrinsic time constant term specific to the injection transformer;
  applying a first modification to the alpha and beta voltage compensation terms based on the generated alpha and beta flux terms, respectively, and an extrinsic time constant term calculated to gradually reduce any flux offset in the injection transformer;
  calculating a peak flux level representation for the injection transformer based on the generated alpha and beta flux terms, respectively, and generating a limiter term based on a comparison of the calculated peak flux level representation to a preset positive flux threshold; and
  applying a second modification to the alpha and beta voltage compensation terms based on the generated alpha and beta flux terms, respectively, and the generated limiter term to prevent the peak flux level representation in the injection transformer from exceeding the positive flux threshold.

43. A method according to claim 42, wherein the step of modeling the injection transformer flux and generating alpha and beta flux terms comprises the steps of:
   integrating the alpha and beta voltage compensation terms to generate respective alpha and beta flux terms;
   amplifying the alpha and beta flux terms by the intrinsic time constant term, respectively; and
   feeding back the amplified alpha and beta flux terms into their respective alpha and beta voltage compensation terms via a negative feedback loop.

44. A method according to claim 42, wherein the step of applying a first modification to the alpha and beta voltage compensation terms comprises the steps of:
   amplifying the alpha and beta flux terms by the extrinsic time constant term; and
   feeding back the amplified alpha and beta flux terms into their respective alpha and beta voltage compensation terms via a negative feedback loop.

45. A method according to claim 42, wherein the step of generating a limiter term based on the comparison of the calculated peak flux level representation to the preset positive flux threshold comprises the steps of:
   generating one of (i) a limiter term of substantially zero if the calculated peak flux level is within a range between zero and the preset positive flux threshold, and (ii) a non-zero limiter term whose magnitude is dependent on an amount by which the calculated peak flux level representation exceeds the positive flux threshold; and
   amplifying the generated limiter term by a preset scalar.

46. A method according to claim 42, wherein the step of applying a second modification to the alpha and beta voltage compensation terms comprises the steps of:
   multiplying the alpha and beta flux terms by the amplified limiter term, respectively; and
   feeding back the multiplied alpha and beta flux terms into their respective alpha and beta voltage compensation terms via a negative feedback loop.

47. A method according to claim 42, wherein the active voltage conditioner is configured to condition a three-phase mains supply.

48. A method according to claim 42, wherein primary terminals of the injection transformer are connected to an output of a three-phase inverter, such that the injection transformer is configured to utilize the alpha and beta voltage compensation terms calculated in a stationary reference frame to generate corresponding Pulse Width Modulated (PWM) signals for driving the inverter to generate appropriate compensating voltages for application to the primary terminals of the injection transformer.

49. A method according to claim 42, wherein the active voltage conditioner is online so as to continuously monitor the mains supply voltage and continuously apply a compensating voltage via the injection transformer to regulate the voltage supply supplied by the mains supply voltage.

50. A method according to claim 42, wherein the controlling of the core flux level avoids magnetic saturation of the injection transformer.

* * * * *